UNITED STATES PATENT OFFICE.

JOHN C. SCHUMAN, OF AKRON, ASSIGNOR TO WILLIAM T. JEBB, OF BUFFALO, NEW YORK.

MANUFACTURE OF GRAPE-SUGAR AND GLUCOSE.

SPECIFICATION forming Letters Patent No. 320,403, dated June 16, 1885.

Application filed May 18, 1885. (No specimens.)

*To all whom it may concern:*

Be it known that I, JOHN C. SCHUMAN, of Akron, in the county of Erie and State of New York, have invented a new and useful Improvement in the Manufacture of Grape-Sugar and Glucose, of which the following is a specification.

This invention relates to an improvement in the manufacture of grape-sugar and glucose from Indian corn, and has for its object to produce the grape-sugar or glucose in a simple, expeditious, and inexpensive manner by extracting a comparatively-pure crude starch from the corn, and then converting such crude starch into grape-sugar or glucose.

In practicing my invention the corn is first steeped in a suitable vat or tank, which is provided with a perforated false bottom for draining at a temperature of about 140° Fahrenheit for about fifteen hours, and this temperature is maintained in the steep-tank by renewing the water from time to time from a tank containing hot water. The temperature is preferably not allowed to rise to 155° Fahrenheit, as it would cause the starch-cells to burst and render the subsequent recovery of the starch difficult, if not impossible. When the steeping is completed the kernels of corn have become expanded, swelled and softened by the combined action of the heat and moisture, and the hulls and germs tend to separate from the starchy portions of the kernels, so that these component parts of the kernels are only loosely held together and in a condition in which they can be partially detached from each other by the following process: The warm water is now drawn from the steep, and cold water is introduced into the same, whereby the corn is cooled or chilled. This not only presents the corn to the subsequent operation of reduction in a cold state, but also tends to toughen the hulls and germs and renders them less liable to become finely pulverized in reducing the kernels. The water is next drained thoroughly from the corn in the steep-vat, a period of from four to six hours being usually allowed for this purpose. The steeped corn, after having been thoroughly drained, is next reduced in a suitable mill, which is preferably a disk-mill, in which one disk has a slight eccentric movement with reference to the other, and which is known as the "Bogardus mill;" or, if preferred, a roller-mill or other reduction-machine whereby the corn is coarsely ground or crushed, may be employed for this purpose. By this machine the corn is coarsely ground or reduced, whereby the hulls and germs are to a large extent detached from the starchy portions of the kernels in comparatively large fragments, while the starchy portions are more finely reduced, so that a large proportion of the starch can be separated from the fragments of hulls and broken germs. This is accomplished by a suitable vibrating or rolling screen, which is so clothed that the starch passes through the meshes of the screen while the hulls and broken germs tail off together; or, if desired, the reduced material may be divided by the screen into a number of different products of different degrees of fineness, the finest product being crude starch, while the coarser products consist of fragments of hulls and broken germs containing a greater or less admixture of starch. The tailings or coarse offal of the first separation are preferably reduced again, for the purpose of detaching the starch which may adhere to the fragments of hulls and germs, and this detached starch is recovered by a second sifting operation and added to the starch of the first separation. This crude starch or starch-meal may now be converted into grape-sugar or glucose; but before doing so it is preferably reground in a suitable mill, either wet or without additional water, to reduce it to a higher degree of fineness. This crude starch is next puddled with water in a suitable vat until the liquid has reached a gravity of from 16° to 20° Baumé. About one per cent. of diluted sulphuric acid is then added to the starch-milk in the puddling-vat and thoroughly mixed therewith. Acid of a strength of 66° Baumé is preferably employed and diluted in the proportion of one part of acid to two parts of water. If it is desired to manufacture grape-sugar or block-glucose, the liquid is next pumped into a closed converter, which latter has been charged with a sufficient quantity of water to prevent the starch from being burned or coagulated while running it into the converter. The starch is now converted under a steam-pressure of about forty pounds to the square inch, and when the desired saccharification has been reached the liquid is discharged from the converter, neutralized with marble dust, bleached, filtered, and concentrated in the vacuum-pan in any suitable or well-known manner. If it is desired to manufacture liquid glucose or sirup, the acidulated starch-milk is delivered into an open converter, and the starch is converted therein under the pressure of the atmosphere. When the desired degree of conversion has been reached, the liquid is withdrawn from the converter and neutralized, bleached, filtered, and concentrated in any suitable manner. In this case the starch may be run directly from the separating-sieves into the converter, which has been charged with a suitable quantity of water when the diluted acid is run into the converter at the same time, both the starch and acid being introduced separately and slowly. The crude starch, which is in this manner extracted from the corn and converted, is comparatively pure, thereby avoiding discoloring of the product and facilitating the operations of filtering and bleaching. The bulk of the material which is converted is greatly reduced as compared with processes which attempt to convert the whole grain, and the product is much purer, while the crude starch is obtained at much less expense than the refined starch which is now generally used in the manufacture of grape-sugar and glucose. The offal is only slightly moist, and contains no deleterious substances, and can therefore be advantageously used as cattle-feed either moist or dried.

I claim as my invention—

1. The herein-described process of manufacturing grape-sugar or glucose from Indian corn or maize, which consists in steeping the corn, then draining the corn, then grinding or crushing the corn, then separating the crude starch from the coarse offal by sifting, and then converting the separated crude starch into grape sugar or glucose, substantially as set forth.

2. The herein-described process of manufacturing grape-sugar or glucose from Indian corn or maize, which consists in steeping the corn, then draining the corn, then grinding or crushing the corn, then separating the crude starch from the coarse offal by sifting, then grinding the crude starch with water, then acidulating the starch-liquid, and then converting it into grape-sugar or glucose, substantially as set forth.

Witness my hand this 15th day of May, 1885.

JOHN C. SCHUMAN.

Witnesses:
WM. H. CARR,
W. ELMORE.